United States Patent [19]

Reafler et al.

[11] Patent Number: 5,026,448

[45] Date of Patent: Jun. 25, 1991

[54] METHOD OF FORMING A GLOSSY BASECOAT-CLEARCOAT SURFACE ON A SUBSTRATE

[76] Inventors: Gerald G. Reafler; Gordon D. Shattuck, Jr., both of 343 State St., Rochester, N.Y. 14652-3901

[21] Appl. No.: 332,061

[22] Filed: Apr. 3, 1989

[51] Int. Cl.⁵ ............................................. B32B 31/00
[52] U.S. Cl. ...................................... 156/212; 156/216; 156/229; 156/263; 156/285; 156/286; 428/480
[58] Field of Search ............. 428/480; 156/285, 286, 156/216, 229, 263, 212

[56] References Cited

U.S. PATENT DOCUMENTS 3,846,200  11/1974  Doerfling et al. .................. 156/212
4,032,089   6/1977  Kinzler et al. .................. 156/229 X
4,769,100   9/1988  Short et al. ........................ 156/285
4,828,637   5/1989  Mentzer et al. ..................... 156/212

FOREIGN PATENT DOCUMENTS 0251546  6/1987  European Pat. Off. .

Primary Examiner—David A. Simmons
Assistant Examiner—Thi Dang

[57] ABSTRACT

A flexible, thermoformable sheet material is bonded to a three-dimensional substrate to form a protective and decorative surface having the appearance of a basecoat-clearcoat automotive finish by a method which includes sequentially thermoforming a thermoplastic paint-coated basecoat sheet and a thermoplastic clearcoat sheet onto the substrate.

14 Claims, 1 Drawing Sheet

METHOD OF FORMING A GLOSSY BASECOAT-CLEARCOAT SURFACE ON A SUBSTRATE

FIELD OF INVENTION

This invention relates to a method of forming a glossy protective and decorative basecoat-clearcoat surface on a three-dimensional substrate.

BACKGROUND OF THE INVENTION

As an improvement over the spray painting of articles such as automobile bodies and household appliances, a new kind of sheet material has been developed to provide protective and decorative coatings. The new material comprises a flexible, stretchable, thermoplastic support sheet, also known as a carrier film, which has a protective and decorative paint layer, also called a basecoat, of uniform thickness and appearance on one side and, covering the basecoat, a transparent topcoat or, as it is commonly called, a clearcoat. It can also have other layers such as a tie or bonding layer between the paint layer and the carrier film. Using known procedures such as vacuum thermoforming and in-mold bonding, the sheet material can be stretched and bonded to an article such as an automobile body panel to provide a basecoat-clearcoat finish. To facilitate the bonding of the sheet material to substrates, an adhesive layer, preferably a pressure-sensitive adhesive layer, can be formed on the back side of the carrier film. Important advantages of the paint-coated sheet material over spray painting include economy in the use of paint and avoidance of air pollution by evaporating solvents.

A new sheet material of this kind and a process for its manufacture are described in the U.S. patent application of G. G. Reafler, Ser. No. 116,426, filed Nov. 3, 1987. The process involves providing a laminar flow of the coating composition on the surface of the thermoplastic carrier film to form a layer of substantially uniform thickness, followed by a drying procedure, then coating and drying each additional layer in sequence to obtain a finished product of excellent gloss and smoothness. Paint-coated sheet material made by this process has a remarkably more attractive appearance than spray painted finishes.

The transparent topcoat, which can be clear or lightly colored, provides a number of desired properties for the paint-coated sheet material. It improves resistance to abrasion and weathering. It can also provide or improve the surface qualities of gloss and distinctness of image (DOI), as well as desired friction control properties such as slip or lubricity. Since the new sheet materials are especially intended for use as automotive coverings which demand high gloss and other surface qualities, further improvement in these qualities is desirable. Especially it is desirable to reduce or eliminate any tendency toward loss of gloss and DOI when the sheet material is stretched during thermoforming.

In the manufacture of the Reafler sheet material the transparent topcoat is applied by coating a liquid clearcoat composition onto the paint layer. In a more recent procedure described in the copending patent application of James R. Schuler, U.S. Ser. No. 313,269 filed Feb. 17, 1989 entitled "Thermoformable Sheet Material", a prefabricated transparent polymeric sheet is bonded to the paint layer before the sheet material is thermoformed. U.S. Pat. No. 4,769,100, issued Sept. 6, 1988, and European patent application No. 0,251,546, published Jan. 7, 1988, disclose a method in which a thin layer of liquid clearcoat is applied to a prepainted carrier film which, in a previous step, has been vacuum formed onto a substrate. However, neither disclosure suggests applying the clearcoat in the form of a prefabricated sheet.

The present invention offers an alternative method for applying a clearcoat to a paint-coated film or sheet. The new method provides advantages when the paint-coated sheet must be stretched substantially during thermoforming. A problem that occurs when a thermoplastic sheet having a paint coating and a clearcoat is thermoformed and stretched to a high degree is that the film loses gloss and distinctness of image in its most highly stretched areas. This problem is particularly troublesome when the paint layer contains light-reflective flakes such as aluminum flakes. Several techniques for alleviating the problem have recently been proposed. The present invention offers another way that can be used alone or with other techniques.

BRIEF SUMMARY OF THE INVENTION

The present invention provides an improvement in the use of protective and decorative sheet materials intended for thermoforming bonding to three-dimensional substrates such as exterior or interior automobile parts, appliances, and the like. The improvement reduces the potential for loss of desirable surface qualities when such materials are stretched by thermoforming and bonded to a substrate. It also offers advantages with respect to a wider selection of clearcoat materials and to the covering of highly contoured substrate surfaces, as will be further described.

More specifically, this invention relates to a method of forming a glossy protective and decorative basecoat-clearcoat surface on a three-dimensional substrate which comprises heating, stretching and bonding a thermoplastic basecoat sheet to the substrate, heating a thermoplastic clearcoat sheet, and stretching and bonding the heated clearcoat sheet to the basecoat sheet on the substrate.

THE DRAWINGS

The invention will be further described by reference to the drawings, of which:

Figure 5:
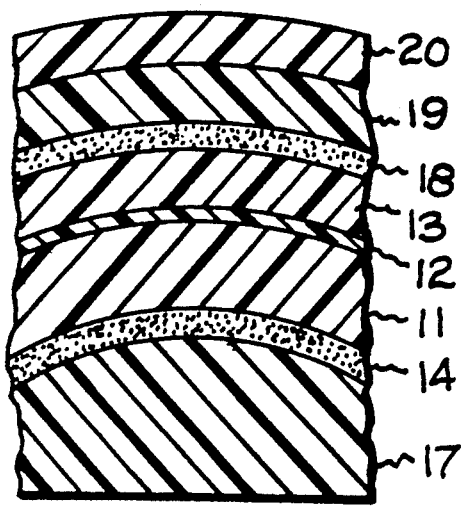

In FIG. 5 the prefabricated clearcoat sheet carries a clear topcoat layer which is applied as a liquid coating composition prior to bonding the clearcoat sheet to the paint layer.

DETAILED DESCRIPTION

As indicated above, the method of the invention involves thermoforming a basecoat sheet to a substrate and thereafter thermoforming a prefabricated clearcoat sheet over the thermoformed basecoat sheet on the substrate. An unexpected advantage of the new method for forming basecoat-clearcoat layers on a substrate is that after thermoforming and stretching of the basecoat and clearcoat sheets, the surface of the resulting article retains a high level of gloss and DOI.

In addition to the advantage of retention of gloss and DOI, another advantage offered by the method of the invention is that the temperature for thermoforming the clearcoat sheet can be below the temperature for thermoforming the paint-coated basecoat sheet when the glass transition temperature (Tg) of the prefabricated clearcoat sheet is lower than that of the basecoat carrier film. Consequently, the choice of materials for the manufacture of either sheet or film is broadened.

Furthermore, since the paint-coated sheet and the clearcoat sheet are each thinner than the total composite, they can be vacuum formed separately on highly contoured substrates more readily than a thick composite comprising both a paint layer and a clearcoat.

In addition, because the clearcoat sheet is attached in a separate thermoforming step, a variety of different paint and clearcoat combinations are possible. For example, various paint-coated films can be prefabricated and later used with any selected clearcoat sheets.

Figure 1:
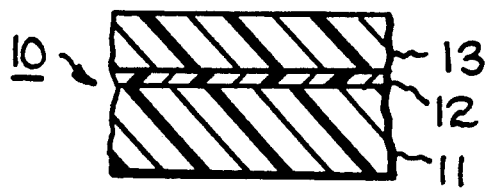
FIG. 1 is a diagrammatic cross-section, not to scale, of a paint-coated basecoat sheet prior to its thermoforming bonding to a substrate.

FIG. 1 is a cross-sectional sideview of one embodiment of a themoformable basecoat sheet 10 prior to its bonding to a substrate. The basecoat sheet which can also be called a paint-coated film, includes a flexible and stretchable, thermoplastic polymeric carrier film 11. Coated on the carrier film 11 is a protective and decorative paint layer 13, as used in automotive finishes. The paint layer may optionally carry a clearcoat layer (not shown) of a composition commonly used in the clearcoat component of automotive basecoat-clearcoat systems.

Although not always essential, a thin tie layer 12 can be coated and dried on the carrier film before the paint layer is coated in order to improve the bonding of the paint layer to the carrier film.

Figure 2:
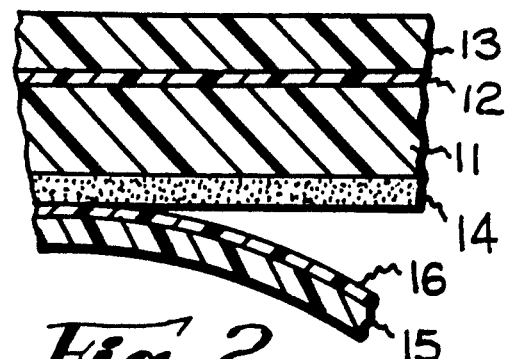
FIG. 2 shows a basecoat sheet having coated on the carrier film opposite the paint layer, a pressure-sensitive adhesive back layer.

In FIG. 2, coated on the carrier film 11 opposite the paint layer 13 is an optional adhesive layer 14 which preferably is formed from a pressure-sensitive adhesive composition. This provides a means for securely bonding the sheet material to a substrate such as an automobile panel. Following the application of the adhesive layer 14, the sheet material is interwound with a thin release sheet 15 of, e.g., polyester film, to permit tack-free winding of the sheet material on a core. An optional silicone release coating 16 can be on the release sheet 15 to aid in stripping it from the adhesive back layer prior to thermoforming the sheet material to a substrate.

In the method of the invention, the basecoat sheet and the prefabricated clearcoat sheet are separately stretched and bonded by thermoforming to a three-dimensional or contoured substrate such as an automobile panel. The procedure of thermoforming can be substantially as described in the patent to Short et al, U.S. Pat. No. 4,769,100 wherein an adhesive coated sheet is heated and then drawn by vacuum into bonding contact with the substrate. For the basecoat sheet another suitable thermoforming techniques is the well-known in-mold technique in which the basecoat sheet, having no adhesive layer, is placed in a mold and then a substrate plastic is injected into the mold at elevated temperature and pressure to heat, stretch and thermally bond to the basecoat sheet. This technique is described, for example, in European patent application No. 0 285 071 of Avery International Corporation, published 5 Oct. 1988. The term thermoforming is used herein to include both of such forming techniques in which a thermoplastic sheet is heated, stretched and bonded to a substrate.

Figure 3A:
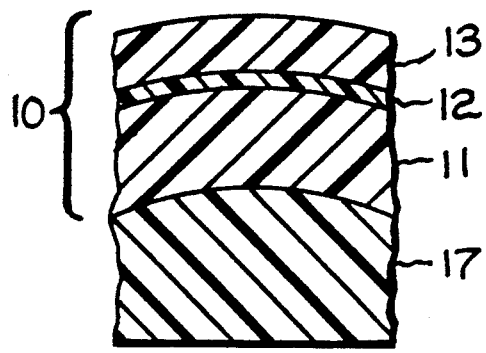
FIGS. 3a and 3b are diagrammatic cross-sections, not to scale, of the paint-coated sheets of FIGS. 1 and 2 bonded to a substrate.

FIG. 3a shows the paint-coated basecoat sheet 10 of FIG. 1 after its thermoforming bonding to a substrate 17, the bond being formed, e.g., by fusion in the in-mold process.

Figure 3B:
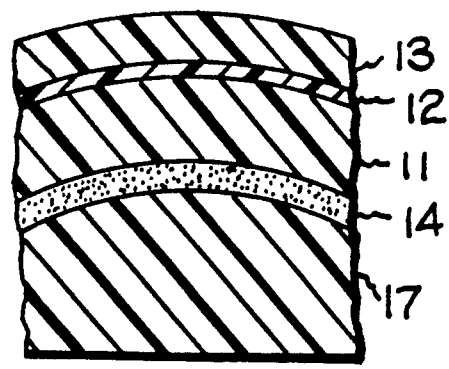

FIG. 3b shows the basecoat sheet 10 of FIG. 2 (having adhesive layer 14 coated on the backside of carrier film 11) after being bonded to substrate 17 by vacuum thermoforming. In this case, the basecoat sheet, after being clamped in the frame of a thermoforming apparatus, is drawn by vacuum into contact with the prefabricated substrate and is bonded to it by the pressure-sensitive adhesive layer 14.

Figure 4:
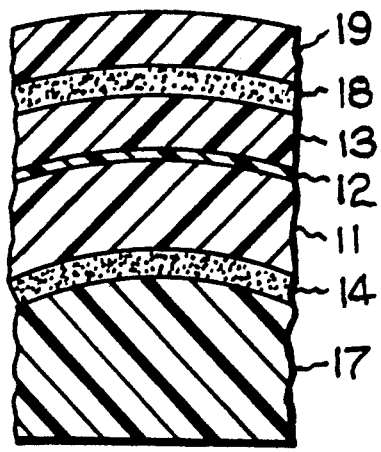
FIG. 4 shows in diagrammatic cross-section, not to scale, an article comprising a substrate covered with the basecoat sheet of FIG. 1 to which a prefabricated clearcoat sheet has been applied in a separate thermoforming step by the method of this invention.

After the paint-coated sheet is heated, stretched and bonded to the substrate by thermoforming, the method of the invention applies a prefabricated clearcoat sheet 19 over the basecoat sheet on the substrate. This too is done by thermoforming, the clearcoat sheet being heated, stretched and bonded to the thermoformed basecoat sheet, for example, by adhesive layer 18, as is shown in FIG. 4. Sheet 19 is a prefabricated clearcoat sheet of a transparent thermoplastic stretchable polymer which preferably is clear but, if desired, can be lightly tinted. Both kinds of transparent sheets are referred to herein as clearcoat sheets.

The clearcoat sheet 19 can be made from a wide range of thermoplastic polymer compositions, including homopolymers, copolymers and polymer blends. Examples include "Kodar ® PETG Copolyester 6763" and "Kodar ® PCTG Copolyester 5445" supplied by Eastman Chemical Products, Inc. of Kingsport, Tenn. These are amorphous (noncrystalline) thermoplastic polyesters of the poly(ethylene therephthalate) family. More particularly, they are ethylene-1,4-cyclohexylene-dimethylene terephthalate copolymers. Another, suitable polymer supplied by the same company as "Kodar ® A150 Copolyester" is a copolymer of terephthalic acid and isophthalic acid with 1,4-cyclohexanedimethanol. Each of these thermoplastic polymers form films which stretch when heated in the thermoforming process and provide a smooth, glossy topcoat for the sheet material of the invention.

Other useful polymers for the prefabricated clearcoat sheets include any thermoplastic polymers of which the films can be stretched at thermoforming temperatures and that have the desired physical properties such as gloss and hardness. Examples include polycarbonates, polyacrylates, polyurethanes and the like.

The transparent clearcoat sheet can be made by any conventional film forming techniques. Preferably, it is made by extruding a molten polymer onto a chilled roll in known manner but other methods such as casting from a volatile solvent solution can also be used. The thickness of the sheet can vary over a wide range, very thin sheets of 0.025 mm (1 mil) thickness or even thinner being suitable as well as thick sheets of 0.25 mm (10 mils) or greater thickness. Preferably, the thickness is in the range from about 0.05 to 0.2 mm (2 to 8 mils). For optimum results the sheet thickness should be highly uniform.

Although other techniques can be used, the preferred method of bonding the prefabricated clearcoat sheet to the paint-coated basecoat sheet is by means of a pressure-sensitive adhesive which is coated on the clearcoat sheet before it is applied to the paint layer. It is also possible to apply the adhesive layer over the paint layer of the basecoat sheet or to both the basecoat sheet and the clearcoat sheet. The pressure-sensitive adhesive layer provides a tenacious bond between the paint layer and the prefabricated transparent polymeric sheet.

Preferred adhesives of this type are acrylic adhesives. Examples include acrylic copolymers of a higher alkyl acrylate such as 2-ethylhexyl acrylate copolymerized with a polar comonomer such as acrylic acid, acrylamide or maleic anhydride. The adhesive is coated from a solution with water or an organic solvent which also can contain additives such as a tackifier resin. Further examples of useful acrylic pressure-sensitive adhesives are described in the patent to Traynor et al, U.S. Pat. No. 4,726,982 of Feb. 23, 1988.

The adhesive layer preferably is applied to the clearcoat sheet by a laminar flow coating method, followed by drying, as described in U.S. Pat. application Ser. No. 116,426, at a dry thickness of about 0.04 to 0.12 millimeters (1.5-5 mils). Advantageously, the adhesive layer is coated by means of a high precision extrusion hopper, for example, as described in the patent to Beguin U.S. Pat. No. 2,681,294.

Although a smooth glossy clearcoat sheet usually is preferred, it may be desirable to modify the surface characteristics of clearcoat sheet 19. Such modifications can include providing a satin finish or other surface texture or patterned finish. Suitable methods and compositions for modifying the surface appearance of the sheet material are disclosed in U.K. patent application No. 2,031,301, published Apr. 23, 1980; and Products Licensing Index, Dec. 1970, p. 53.

In another embodiment of the invention as shown in FIG. 5, the transparent sheet 19 is covered with an optional transparent surface layer 20 designed to impart specific desirable surface characteristics to the sheet material. Layer 20, which may contain addenda such as an anti-abrasion agent, UV absorber, pigment, dye, slip or friction control agent, etc., preferably is applied to sheet 19 by a laminar flow coating technique such as described in the patent to Beguin U.S. Pat. No. 2,681,294 prior to bonding the sheet to the previously thermoformed paint layer 13. The dry thickness of layer 20 advantageously is from about 0.01 to 0.1 mm (0.4-4 mils). It may also be applied in the form of a dilute liquid "wash" to the clearcoat sheet 19 either before or after the latter is bonded to the paint layer, for the purpose of modifying the surface characteristics of the clearcoat sheet 19.

Compositions for the optional transparent surface layer 20 include crosslinkable clearcoat compositions employed in automotive surface finishing. They are transparent and generally comprise (a) as one component, a crosslinkable polymer such as a polyester polyol, a polyurethane polyol, or an acrylic polyol and (b) as a second component, a curing or crosslinking agent such as a polyisocyanate. Each component is dissolved in a volatile organic solvent such as acetone or toluene. Examples of such compositions include crosslinking polyurethane film-forming compositions which are formed by the reaction of a crosslinkable urethane polymer with a crosslinking agent. One such composition is the solvent-based system comprising a polyurethane polyol as one component and a polyisocyanate as the other, as disclosed in the patent to Porter, U.S. Pat. No. 4,719,132. Especially preferred is a two-component composition disclosed in this patent, of which one component comprises a crosslinkable poly(ester-urethane) polyol and the other comprises a polyisocyanate crosslinking agent such as a polyfunctional aliphatic isocyanurate of 1,6-hexamethylene diisocyanate. Other useful clearcoat compositions include those described in the patents to Ambrose et al. U.S. Pat. No. 4,699,814; Simpson et al, U.S. Pat. No. 4,650,718; Singer et al, U.S. Pat. No. 4,681,811; Singer et al, U.S. Pat. No. 4,703,101; and Backhouse, U.S. Pat. No. 4,220,679 and U.S. Pat. No. 4,403,003. These same polymeric film forming compositions can also be used to make the prefabricated clearcoat sheet.

The carrier film for the basecoat is an essentially planar, self-supporting, stretchable, flexible, thermoplastic polymeric film which can be transparent, translucent or opaque. It has a substantially uniform thickness, preferably, in the range from about 0.05 to 0.50 millimeter (2 to 20 mils). A preferred thickness is in the range from about 0.16 to 0.32 millimeters (6 to 13 mils).

The carrier film has heat softening and tensile elongation properties suitable for the thermoforming process. Preferred polymeric materials for the film are those known to be useful in thermoforming techniques, such as polyvinyl chloride, polyvinyl acetate, ABS (acrylonitrile-butadiene-styrene) resins, polyethylene and polypropylene. Useful carrier film polymers include the polyacrylate blends with copolyesters described in U.S. Pat. No. 4,246,381, and the copolyesters derived from aromatic polyesters and glycol polyesters described in U.S. Pat. No. 4,287,325. Blends of rubber-modified styrene-maleic anhydrides with polycarbonates and/or polyesters are also useful, as are blends of poly(ether-esters) and polyesters. Particularly preferred carrier film materials exhibit a tensile elongation at break of at least about 40 percent when measured in accordance with ASTM D-638. A highly preferred carrier film material is a blend of copolyesters based on poly(1,4-cyclohexylenedimethylene terephthalate) and rubber-modified styrene-maleic anhydride copolymers as described in U.S. Pat. No. 4,582,876. A specific example of a polymer blend of this kind which can be extruded as a carrier film consists of a blend of 55:45% by weight of a copolyester and "Dylark 600" styrene copolymer. The latter is a rubber-modified styrene-maleic anhydride copolymer available from ARCO Chemical Company, a division of Atlantic Ridgefield Company. The copolyester is derived from terephthalic acid, 19 mole % ethylene glycol and 81 mole % 1,4-cyclohexanedimethanol.

Other examples of stretchable carrier films include the highly flexible and stretchable films which are made by the extrusion of blends of a flexible poly(etherester) with a more rigid polyester as described in the copending application of Seymour, Ser. No. 151,727 filed Feb. 7, 1988. A carrier film made from a highly flexible polymer composition such as this is especially useful for making a basecoat sheet which is to be bonded to a contoured substrate by the in-mold method. The carrier film can include fillers, UV absorbers, plasticizers, colorants, antioxidants, etc, known to be useful in polymeric films.

Paint layers for the basecoat sheet comprise a colorant incorporated in a film forming binder. Conventional colorants for paint compositions can be employed, including inorganic pigments such as titanium dioxide, iron oxide, chromium oxide, lead chromate, carbon black, silica, talc, china clay, metallic oxides, silicates, chromates, etc., and organic pigments, such as phthalocyanine blue, phthalocyanine green, carbazole violet, anthrapyrimidine yellow, flavanthrone yellow, isoindoline yellow, indanthrone blue, quinacridone violet, perylene reds, diazo red and others known to those skilled in the art.

The paint layer can also include light-reflective flakes in addition to a colorant and binder. In fact, when light reflective flakes are included in the paint layer, the preformed topcoat film provides special advantages in preserving the gloss of stretched sheet materials. When the sheet materials have a flake-containing paint layer the loss of gloss after stretching is a greater potential problem than it is when the paint contains no flake. The preformed topcoat film in accordance with the invention markedly reduces such loss of gloss.

Any light-reflective flakes conventionally employed in paints, particularly those employed in automotive finish paints can be used. Suitable reflective flakes include metallic flakes such as aluminum flake, copper flake, bronze flake, copper bronze flake, nickel flake, zinc flake, magnesium flake, silver flake, gold flake, platinum flake and other platelets such as mica, glass, stainless steel, coated mica, coated glass, and aluminum coated polyester film fragments. Mixtures of two or more types of flakes can be used.

The film-forming binder can comprise any of the film-forming resins conventionally used as binders in basecoat compositions. Particularly useful resinous binders are acrylic polymers, polyesters, including alkyds, and polyurethanes. Examples of such binders and methods of preparation are described in U.S. Pat. Nos. 4,681,811 and 4,220,679. Also, water-based polyurethanes such as described in U.S. Pat. No. 4,147,679 can be used as the resinous binder in the paint layer. Water-based basecoats in color-plus-clear compositions as disclosed in U.S. Pat. Nos. 4,719,132 and 4,403,003, are also useful. The paint layer preferably has a mean thickness in the range from about 0.012 to 0.08 millimeters (0.5 to 3 mils). A particularly preferred mean thickness is in the range from about 0.020 to 0.060 millimeters (0.8 to 2.4 mils). The paint layer preferably is applied by forming a laminar flow of the paint composition, and directing the flow into contact with the moving carrier film web to form the paint layer.

The laminar flow coating techniques that are useful in the method of the invention include direct extrusion onto the moving carrier film web by use of an extrusion hopper which applies the coating composition by a bead coating or a stretch-flow coating mechanism, extrusion of the coating composition through a slot with subsequent travel down the slide surface of a slide hopper or subsequent free fall in a curtain coating process, curtain coating processes in which the curtain is generated by the use of an overflow weir, and so forth, as further described in Reafler patent application Ser. No. 116,426. Especially preferred is laminar flow coating by means of an extrusion coating hopper as disclosed, for example, in the patent to Beguin U.S. Pat. No. 2,681,294.

Although laminar flow coating of the paint layer is highly preferred because of the uniform and excellent quality of such coatings and because of the control of environmental emissions that laminar flow coating affords, the prefabricated clearcoat sheet can be applied to basecoats formed by less desirable methods. Other such coating methods that have been proposed for paint coated films include spraying and reverse roll coating as described in, for example, the patent to Short et al, U.S. Pat. No. 4,769,100 (General Motors), European patent application No. 285,071 A2, published Oct. 5, 1988 (Avery International Corp.); European patent application No. 266,109 A2 published May 4, 1988 (Rexham Corp.); and European patent application No. 230,364 published Jul. 29, 1987 (3M Company). Even with spray painting of the basecoat, for example, at least some of the advantages of the preformed topcoat will also be observed. An advantage of the present invention is that the preformed clear sheet which is bonded to the paint layer will tend to mask defects in the spray coated paint layer and will provide a better appearance than would a sprayed topcoat.

The paint layer can be coated on a support having an adhesion promoting tie-layer. Tie-layers can be formed from compositions comprising an adhesion promoting species and optionally a solvent. Useful adhesion promoting species include polymers derived from acrylonitrile, vinylidene chloride, and acrylic acid; polymers derived from methylacrylate, vinylidene chloride and itaconic acid; cellulose nitrate, and a variety of commercially available adhesion promoting species, for example, those known under the trade designations FORMVAR 7/95, FORMVAR 15/95, BUTVAR B-98 and BUTVAR B-72, sold by Monsanto, MOBAY N-50 sold by mobay, VINAC B-15 sold by Air Products, ELVACITE sold by DuPont, and LEXAN sold by General electric. Suitable solvents include methylethyl ketone, methylene chloride, tetrahydrofuran, toluene, methyl cellosolve, methanol, ethanol, propanol, butanol, mixtures thereof and the like. The tie-layer preferably has a thickness not greater than about 0.0025 millimeter and preferably is much thinner than the paint layer.

Although the paint layer of the basecoat sheet normally is a continuous layer of one color, it can consist of two or more colors or shades of a single color. It can also include two or more sheets of the same or different appearance which are thermoformed, for example, in parallel strips. By separately thermoforming the single clearcoat sheet over such a plurality of basecoat strips, in accordance with the invention, the junction between the strips is covered and protected.

Benefits of the invention obtained by separately thermoforming a basecoat sheet and clearcoat sheet can be achieved with other kinds of basecoat sheets besides the described paint-coated sheets. These include pigmented polymeric sheets that are made from polymers such as carrier film polymers that are melt-blended or solution-blended with a pigment. It also includes such polymeric sheets, whether otherwise pigmented or not, on which a cracked metallic layer is formed, e.g., by vacuum deposition, followed by bilateral cracking, as described in the copending application of Spahn, Ser. No. 274,214 filed Nov. 21, 1988. All of such decorative sheet materials are included in the term "basecoat sheet" as used herein. The greatest benefits of the invention, however, are obtainable with paint-coated basecoat sheets.

The optional adhesive back layer 14 in FIG. 2 preferably comprises a pressure-sensitive adhesive although heat activated and other adhesives can be used. Preferred are pressure-sensitive acrylic adhesives of the same types described above for bonding the transparent film to the paint layer. The adhesive layer preferably is applied to the back of the carrier film by laminar flow coating as previously described.

Following application of the adhesive back layer 14, a release sheet 15 of FIG. 2 is applied to it to permit winding and handling of the finished sheet material. Release sheet 15 is preferably a polyester film having a silicone coated surface 16 facing the adhesive layer.

In the basecoat sheet the carrier film, the paint layer, and the optional layers have heat softening and tensile elongation properties which render the sheet material suitable for use in the thermoforming process. These properties are mutually compatible so as to permit symmetrical elongation, whereby the basecoat sheet can undergo substantial elongation by the application of stretching forces without crazing or delamination. The carrier film and the layers coated thereon are sufficiently uniform that the sheet material exhibits substantially the same uniformity of appearance before and after the thermoforming process.

The invention is further illustrated by the following examples which provide a comparison between the method of this invention and a method in which a substrate is covered in a single thermoforming step with a sheet material having a clearcoat layer applied to the paint layer from a liquid coating composition prior to thermoforming.

EXAMPLE 1

Invention

Step A

A carrier film was prepared from a blend described in U.S. Pat. No. 4,582,876 as follows. A mixture of 50:50% by weight of polyester (1) and Dylark ® Styrene Copolymer 600 was compounded by extrusion. Polyester (1) was derived from terephthalic acid, 19 mole % ethylene glycol and 81 mole % 1,4-cyclohexanedimethanol. Dylark ® Styrene Copolymer 600 is a rubber modified styrene-maleic anhydride copolymer available from ARCO Chemical Company, a division of Atlantic Richfield Company. The blend was heated to 260°–290° C. and extruded through a die into a nip comprising two temperature-controlled chrome plated stainless steel rollers. The extruded web was then cooled on a chill roller. The thermoplastic film had a mean thickness of about 0.19 mm (7.5 mils) and a maximum thickness deviation of less than 0.02 mm.

Step B

The carrier film prepared as described was coated with a thin layer of an aqueous tie coat composition as described in Table I. After drying, the thickness of the tie-layer was approximately. 0.0005 mm (0.02 mils).

TABLE I

| Tie Coat Composition | |
|---|---|
| Ingredient | Approx. % Weight |
| Ethylene Glycol Monohexyl Ether | <1 |
| Deionized Water | 75 |
| N,N-Dimethyl Ethanolamine | <1 |
| N-Methylpyrrolidone | 1 |
| Diethylene Glycol Monobutyl Ether | 1 |
| Acrylic Resin* | 10 |
| Urethane Resin** | 10 |
| diluted with water to a total solids content of 3.0% by weight | |
| "Fluorad FC 170C" Surfactant, sold by | ~0.05 |

TABLE I-continued

| Tie Coat Composition | |
|---|---|
| Ingredient | Approx. % Weight |
| 3M Company | |

*Styrene-butyl acrylate-butyl methacrylate terpolymer
**Reaction product of methylene dicyclohexyl diisocyanate and an aliphatic diol

Step C

The paint composition of Table II below was metered from a nitrogen gas pressurized vessel through a coating hopper extrusion slot having a width of 0.25 millimeter onto the tie-coated carrier film moving at a speed of 8 m/min. The coating method and apparatus were substantially as described in U.S. Pat. No. 2,681,294 and included means for maintaining a pressure differential across opposite surfaces of the coating ribbon. The coating was dried at 40°–90° C. to a 0.04 mm (1.5 mils) thickness in a plural-stage, continuous flat bed drying apparatus supplied with low velocity, warm air streams as described in the copending patent application of Fronheiser et al. Ser. No. 116,083 filed Mar. 9, 1988.

TABLE II

| Metallic Paint Composition | |
|---|---|
| Ingredient | Approx. % Weight |
| Deionized water | 50 |
| Urethane resin | 25 |
| Aluminum paste | 5 |
| Ethylene Glycol Monohexyl Ether | 5 |
| N-Methylpyrrolidone | 5 |
| Diethylene Glycol Monobutyl Ether | 1 |
| N,N-Dimethyl Ethanolamine | 1 |
| Xylene | 1 |
| Aliphatic Solvent Naphtha | 1 |
| Isopropyl Alcohol | <1 |

Step D

The dried, paint-coated web was wound on a take-up roll, then unwound, and once more drawn through a coating station to form on the backside of the carrier film opposite the tie-layer a thin layer of a pressure-sensitive adhesive which, upon continuous drying to a tacky state, had a thickness of 0.07 mm (2.75 mils). The adhesive was a clear, aqueous acrylic adhesive comprised of 50 weight percent water and 50 weight percent acrylic resin. It is supplied as "Shrink Wrap Adhesive HC7803-VAC" by PPG Industries, Inc. of Pittsburgh, PA.

Step E

A thin polyester film having a thickness of about 0.04 mm (1.5 mils) was applied to the backside adhesive layer as a temporary protective release sheet to permit handling of the sheet material prior to its use. The resulting laminated sheet material, referred to hereinafter as "the first composite", was subsequently bonded to a substrate by the procedure described in Step F below.

Step F

After removal of the release sheet, a sample sheet of the first composite was drawn by vacuum thermoforming into contact with an inclined metal test panel and adhesively bonded to the panel. The sample was heated by infrared heating elements to 135° C. before initiating the vacuum drawdown. As it was drawn onto the inclined test panel, the sample stretched an amount proportional to the distance along the panel, the area at the top of the panel having little or no stretch and the area at the bottom having the maximum stretch of about 200 percent.

Step G

A clear polyester clearcoat sheet was prefabricated by heating the amorphous polyester, "KODAR® PCTG Copolyester 5445" of Eastman Chemical Products, Inc., to a temperature of 280° C. and extruding it through a die into a nip formed by two temperature-controlled, chrome plated stainless steel rollers.

The extruded clear polyester sheet of 0.19 mm (7.5 mils) thickness was coated on one side with a thin layer of the same pressure-sensitive adhesive composition which was coated on the backside of the carrier film in Step D. After drying to a tacky state, the adhesive layer had a thickness of 0.07 mm (2.75 mils). This adhesively coated polyester sheet is referred to hereinafter as "the second composite".

Step H

A thin polyester film having a thickness of about 0.04 mm (1.5 mils) was applied to the adhesive layer of the second composite as a protective release sheet to permit handling of the composite prior to its use. The resulting laminate was wound on a take-up roll.

Step I

After removal of the protective release sheet, a sample sheet of the second composite described in Step G was thermoformed and adhesively bonded as a clear topcoat to the paint layer of the first composite on the panel in the same manner as described in Step F.

Gloss measurements of the resulting test panel were made by ASTM D-523 method at the top, center and bottom of the panel, thus obtaining measurements at the areas of minimum, medium and maximum stretching. A Hunter 20-Degree ASTM Glossmeter was used. Distinctness of Image was measured for the same areas by the ASTM E-430 method using a Hunterlab Model D47R-6 Dorigon Glossmeter.

Results are shown in Table III.

TABLE III

| Effect of stretch on Gloss and DOI Area of Panel | | |
|---|---|---|
| (% Stretch) | Gloss | DOI |
| Top (0-10) | 109 | 89 |
| Center (30-70) | 109 | 92 |
| Bottom (150-200) | 113 | 92 |

EXAMPLE 2

Invention

The procedure of Example 1 was repeated, except that the metallic paint composition described in Step C was replaced with the white paint composition described in Table IV.

TABLE IV

| White Paint Composition | |
|---|---|
| Ingredient | Approx. % Weight |
| Titanium Dioxide | 25 |
| Ethylene Glycol Monohexyl Ether | 5 |
| Diethylene Glycol Monobutyl Ether | 1 |
| Deionized Water | 45 |
| N,N-Dimethyl Ethanolamine | 1 |
| N-Methylpyrrolidone | 5 |
| Urethane Resin | 20 |

Results are shown in Table V.

TABLE V

| Effect of stretch on Gloss and DOI Area of Panel | | |
|---|---|---|
| (% Stretch) | Gloss | DOI |
| Top (0-10) | 100 | 89 |
| Center (30-70) | 106 | 91 |
| Bottom (150-200) | 111 | 96 |

EXAMPLE 3

Invention

The procedure of Example 1 was repeated except that a liquid clearcoat layer of the composition described below was applied by laminar flow to the paint layer of the first composite and dried prior to its thermoforming onto the substrate.

| | Clearcoat Composition | |
|---|---|---|
| | Ingredient | Approx. % Weight |
| A | Urethane Resin | 60 |
| | Toluene | 30 |
| | 2-Butoxy Ethyl Acetate | 10 |
| | Benzotriazole | 1 |
| B* | Polyfunctional aliphatic isocyanurate resin based on 1,6-hexamethylene diisocyanate | 100 |

*Available as Desmodur N-3300 from Mobay Corporation Coatings Division

Composition A diluted to 58% with toluene and composition B diluted to 85% solids with acetone were mixed and, in two passes, coated onto the paint layer and dried to form a clear layer having a total thickness of 0.06 millimeters (2.5 mils). After thermoforming the overcoated first composite onto the substrate, an adhesive-coated prefabricated polyester clearcoat sheet having a thickness of 0.19 mm was thermoformed and bonded onto the first composite in the same manner as described in Example 1.

Results of testing as in Example 1 are shown in Table VI.

TABLE VI

| Effect of stretch on Gloss and DOI Area of Panel | | |
|---|---|---|
| (% Stretch) | Gloss | DOI |
| Top (0-10) | 105 | 87 |
| Center (30-70) | 108 | 84 |
| Bottom (150-200) | 112 | 91 |

COMPARATIVE EXAMPLE A

The procedure of Example 3 was repeated except that the second thermoforming step for applying a prefabricated clearcoat sheet to the basecoat sheet (Step I in Example I) was omitted. The results of thermoforming the basecoat sheet, which had a liquid-coated clearcoat but no separately thermoformed clearcoat sheet, are shown in Table VII.

TABLE VII

| Effect of stretch on Gloss and DOI Area of Panel | | |
|---|---|---|
| (% Stretch) | Gloss | DOI |
| Top (0-10) | 92 | 77 |
| Center (30-70) | 56 | 19 |
| Bottom (150-200) | 24 | 7 |

COMPARATIVE EXAMPLE B

The procedure in Comparative Example A was repeated except that the metallic paint composition was replaced with the white paint composition described in Table IV. The thermoforming test results are shown in Table VIII.

TABLE VIII

| Effect of stretch on Gloss and DOI Area of Panel | | |
|---|---|---|
| (% Stretch) | Gloss | DOI |
| Top (0–10) | 86 | 93 |
| Center (30–70) | 86 | 90 |
| Bottom (150–200) | 86 | 83 |

Comparison of the data in Tables III, V and VI with those of Tables VII and VIII demonstrate the unexpected improvement obtained by the method of this invention in the retention of gloss and DOI in stretched areas of the thermoformed sheets.

The invention has been described in detail with particular reference to preferred embodiments thereof, but it will be understood that variations and modifications can be effected within the spirit and scope of the invention.

We claim:

1. A method for reducing the loss of gloss when forming a glossy protective and decorative basecoat-clearcoat surface on a three-dimensional substrate by stretching and bonding a paint-coated film to the substrate, which comprises:
   heating, stretching and bonding to the substrate a thermoplastic basecoat sheet comprising a paint layer coated on a thermoplastic carrier film, and thereafter
   heating, stretching and bonding a prefabricated thermoplastic clearcoat sheet
   over the stretched paint layer of the basecoat sheet which is bonded to the substrate.

2. A method according to claim 1 wherein the clearcoat sheet is bonded to the basecoat sheet by an adhesive layer.

3. A method according to claim 2 wherein the adhesive is a pressure-sensitive adhesive.

4. The method according to claim 3 wherein a pressure-sensitive adhesive layer is coated uniformly on one side of the clearcoat sheet before bonding it to the basecoat sheet.

5. A method according to claim 1 wherein the basecoat sheet is formed by the laminar flow coating of the paint layer on the thermoplastic carrier film.

6. A method according to claim 5 wherein the paint layer comprises a polyurethane binder and a pigment.

7. A method according to claim 6 wherein the pigment comprises light-reflecting metallic flakes.

8. A method according to claim 1 wherein the carrier film comprises an amorphous thermoplastic polyester.

9. A method according to claim 8 wherein the polyester is a copolymer of terephthalic acid, ethylene glycol and 1,4-cyclohexanedimethanol.

10. A method according to claim 8 wherein the polyester is a copolymer of terephthalic acid, isophthalic acid and 1,4-cyclohexanedimethanol.

11. A method according to claim 1 wherein a transparent surface layer is coated uniformly over the clearcoat sheet from a liquid coating composition prior to bonding the clearcoat sheet to the basecoat sheet.

12. A method according to claim 1 wherein a transparent layer is coated uniformly over the paint layer from a liquid coating composition prior to bonding the clearcoat sheet to it.

13. A method according to claim 1 wherein the basecoat sheet and the clearcoat sheet are bonded to the substrate by vacuum thermoforming.

14. A method according to claim 1 wherein the basecoat is bonded to the substrate by in-mold thermoforming and the clearcoat sheet is bonded to the basecoat sheet by vacuum thermoforming.

* * * * *